(12) United States Patent
Elzur

(10) Patent No.: US 7,385,974 B2
(45) Date of Patent: Jun. 10, 2008

(54) SELF-DESCRIBING TRANSPORT PROTOCOL SEGMENTS

(75) Inventor: Uri Elzur, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 774 days.

(21) Appl. No.: 10/803,719

(22) Filed: Mar. 18, 2004

(65) Prior Publication Data

US 2004/0184459 A1 Sep. 23, 2004

Related U.S. Application Data

(60) Provisional application No. 60/456,266, filed on Mar. 20, 2003.

(51) Int. Cl.
*H04L 12/28* (2006.01)
*H04L 12/56* (2006.01)

(52) U.S. Cl. ........................ 370/389; 370/474

(58) Field of Classification Search ................ 370/389, 370/392, 470–475, 395.52, 351; 709/221–226
See application file for complete search history.

(56) References Cited

U.S. PATENT DOCUMENTS

| 5,500,864 A * | 3/1996 | Gonia et al. ................. 714/807 |
| 6,675,200 B1 * | 1/2004 | Cheriton et al. ............ 709/212 |
| 7,010,613 B2 * | 3/2006 | Connor ....................... 709/236 |
| 7,065,086 B2 * | 6/2006 | Basso et al. ................. 370/394 |
| 7,124,198 B2 * | 10/2006 | Pinkerton .................... 709/236 |
| 2003/0084185 A1 * | 5/2003 | Pinkerton .................... 709/236 |

* cited by examiner

*Primary Examiner*—Ajit G Patel
(74) *Attorney, Agent, or Firm*—McAndrews, Held & Malloy, Ltd.

(57) ABSTRACT

Systems and methods that provide self-describing transport protocol segments are provided. In one embodiment, a system that handles transport protocol segments may include, for example, a sender that adapts a transport protocol segment. The transport protocol segment may include, for example, a self-describing header and an indicator. The indicator may indicate at least one of the presence and the location of the self-describing header.

12 Claims, 10 Drawing Sheets

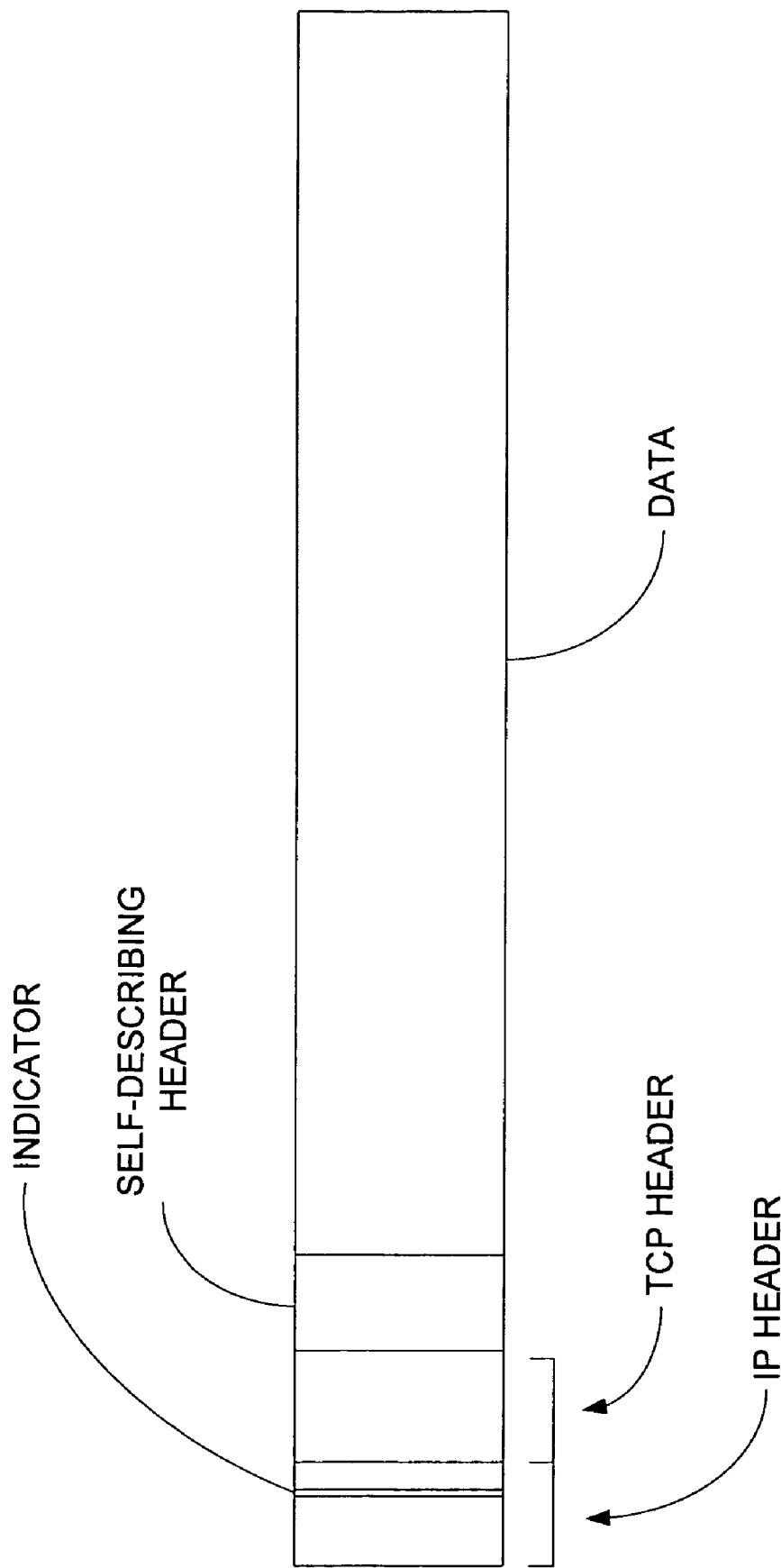

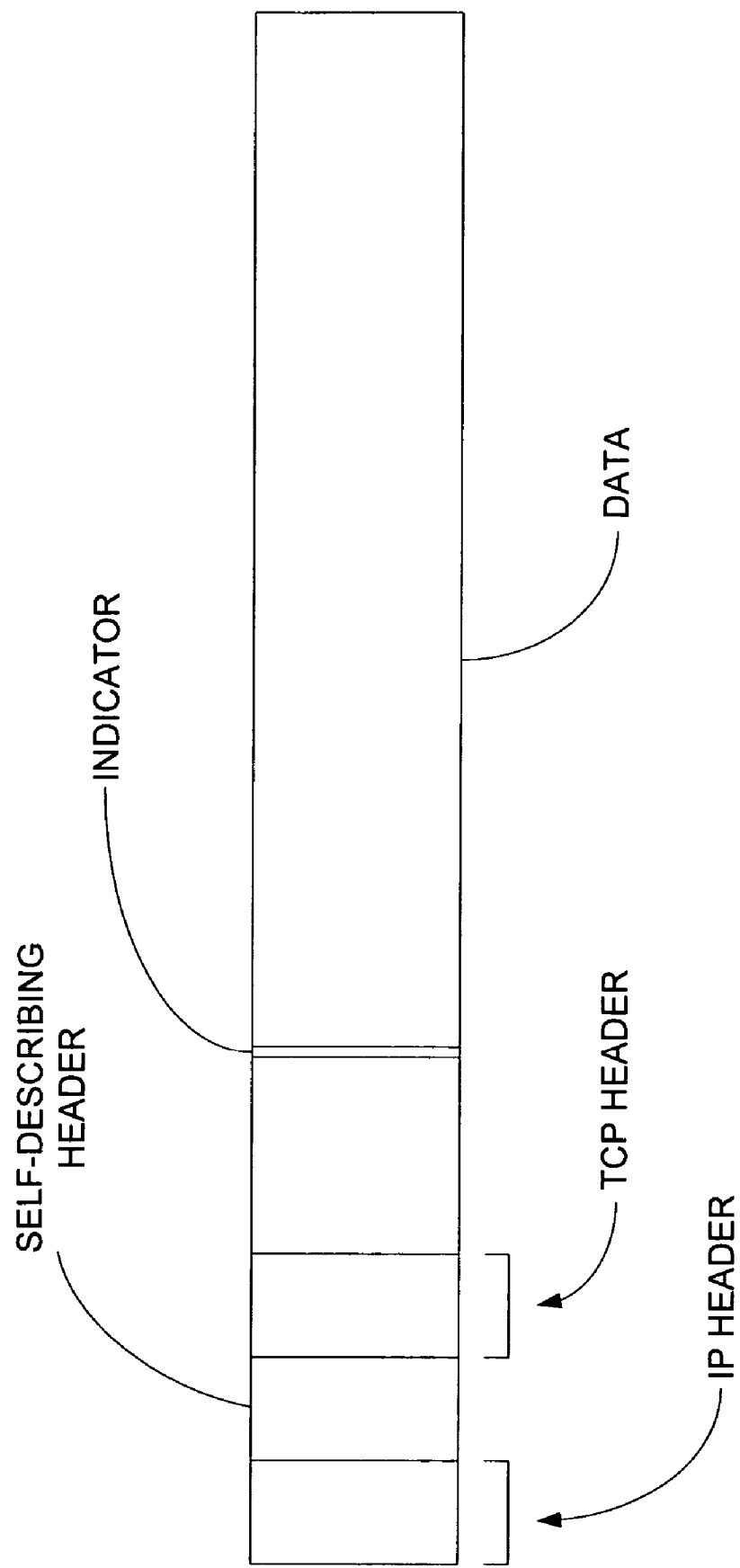

|  | 0 1 2 3 4 5 6 7 8 9 | 1 0 1 2 3 4 5 6 7 8 9 | 2 0 1 2 3 4 5 6 7 8 9 | 3 0 1 |
|---|---|---|---|---|
| | SOURCE PORT | | DESTINATION PORT | |
| | SEQUENCE NUMBER | | | |
| | ACKNOWLEDGEMENT NUMBER | | | |
| | CRC | | | |
| DATA OFFSET | RESERVED<br>INDICATOR | | WINDOW | |
| | CHECKSUM | | URGENT POINTER | |
| | OPTIONS | INDICATOR | PADDING | |
| | INDICATOR | SELF-DESCRIBING HEADER | | |
| | INDICATOR | DATA | | |

FIG. 5B

SELF-DESCRIBING TRANSPORT PROTOCOL SEGMENTS

RELATED APPLICATION

This application makes reference to, claims priority to and claims benefit from U.S. Provisional Patent Application Ser. No. 60/456,266, entitled "Self-Describing Transport Protocol Segments" and filed on Mar. 20, 2003.

INCORPORATION BY REFERENCE

The above-referenced United States patent application is hereby incorporated herein by reference in its entirety.

FEDERALLY SPONSORED RESEARCH OR DEVELOPMENT

Not Applicable

MICROFICHE/COPYRIGHT REFERENCE

Not Applicable

BACKGROUND OF THE INVENTION

The transmission control protocol/internet protocol (TCP/IP) is a protocol that has become widely used for communications. However, receiving, buffering, processing and storing the data communicated in TCP segments can consume a substantial amount of host processing power and memory bandwidth at the receiver. In a typical system, reception includes processing in multiple communications layers before the data is finally copied to a final destination (e.g., an application buffer).

A conventional network interface card (NIC) processes layer 2 (L2) headers (e.g., Ethernet headers) and then copies at least, for example, the remaining headers (layer 3 (L3) and higher) and the upper layer protocol (ULP) payload to a transport buffer (e.g., a TCP buffer) for networking and transport layer processing. The transport and networking processing (e.g., TCP/IP processing in which TCP is the transport layer protocol) typically performed by the central processing unit (CPU) removes L3 headers and L4 headers and then copies, for example, any remaining headers and the ULP payload to another buffer. The process repeats for subsequent levels until the last header is removed and then ULP payload is copied to the buffer assigned by an application.

Typically, most of bytes of the frames are payload (e.g., data), but it is difficult to know the boundary between the various headers and the payload. For the above-identified and other reasons, the payload bytes are copied repeatedly as the control portion of the frames (e.g., the headers) is processed in a layered fashion. The host CPU incurs a substantial overhead for this processing and copying including, for example, handling many interrupts and context switching. Thus, fewer cycles are available for application processing, which is the desired use of a computer (e.g., a server machine). For high-speed networking (e.g., 10 Gigabits per second), the additional copying strains the memory subsystem of the computer. For an average of three data copies, the memory subsystem of most commercially available server computers becomes a bottleneck, thereby preventing the system from supporting, for example, a 10 Gigabit network traffic. In some cases, each host copy can consume more than three times the wire bandwidth for each copy (e.g., 30 Gigabits per second for a 10 Gigabit per second network traffic). Since TCP/IP is the dominant transport protocol used by most applications today, it would therefore be useful to ease the burden of this processing to achieve, for example, scalable low CPU utilization when communicating with a peer machine.

Conventional systems may not reduce overhead, for example, by copying data once from the wire to the application buffer. Typically, the NIC cannot distinguish which portion of a received frame contains ULP data and which portion contains ULP control. Conventional senders may not build frames in a way that facilitates the receiver NIC to make such distinctions. In addition, a typical TCP sender has no mechanism that allows it to segment the byte stream based on PDU boundaries. Conventional systems may not be able to handle such complexities such as, for example, every ULP having its own method for mixing data and control, thereby making it impractical to build a NIC that can distinguish control from data for all of the ULPs or even for a substantial subset of all of the ULPs.

Conventional systems may not be able to directly move data from the TCP byte stream service to the ULP. It is not possible to tell the beginning of a ULP message (e.g., a protocol data unit (PDU)) inside that endless stream of bytes. Assuming that the frames arrive without resegmentation at the receiver (e.g., a server), it is possible that the receiver might be able to unpack the frame using TCP and might be able to locate the ULP header. The ULP header may include, for example, control information that may identify a location in the application buffer where the ULPDU may be directly placed. However, resegmentation is not uncommon in TCP/IP communications. There is no guarantee that the TCP segments will arrive, on the other end of the wire, the way the sender has built them. At present, there is no mechanism that allows the receiver to determine whether a byte stream (e.g., TCP segments) has been subject to resegmentation or whether a byte stream has been received as originally segmented by the sender. If resegmented, a conventional system may typically be unable to determine whether such resegmentation has occurred and cannot rely on the sender to build a TCP segment in a structure known to the receiver. Therefore, a conventional receiver cannot rely on sender-segmented messages to locate the ULP header and the ULPDU in a resegmented TCP byte stream.

For example, there may be network architectural structures between the sender and the receiver. For example, an intermediate box or middle box (e.g., a firewall) may terminate the TCP connection with the sender and, without the sender or the receiver being aware, may initiate another TCP connection with the receiver. The intermediate box may resegment the incoming frames (e.g., by using a smaller TCP payload). Thus, a single frame may enter the intermediate box, but a plurality of smaller frames, each with its own TCP header may exit the intermediate box or vice versa. This behavior by the middle box may disrupt even nicely placed control and data portions.

In the case of resegmentation, the conventional receiver may face a number of challenges. For example, the receiver may not be aware that there are any intermediate boxes between the sender and the receiver. The TCP sender may be considered ULP agnostic and may bear no guarantees as to the mapping of ULP messages into TCP segments or as to the segmentation of TCP segments based on the ULP message boundaries. Furthermore, the initial segmenting scheme used by the sender may not be the segmenting scheme received by the receiver. Thus, although the receiver may be able to place the smaller frames in order, the receiver may be unable to locate the ULP header and the payload without processing the ULP headers. Accordingly, the receiver may not be able to ascertain the control and payload boundary that may be necessary to correctly place the ULPDU payload in the proper location of, for example, the application buffer of the receiver.

Conventional systems may have additional challenges when receiving from TCP/IP networks prone to forwarding to the receiver segments out of order. This is more evident when the ULP has a PDU larger than a TCP segment, which may be limited, for example, to 1460 Bytes when used on top of Ethernet. Thus, the ULPDU may be split among a plurality of TCP segments. Therefore, some TCP segments may contain only data and no control information that instructs the receiving NIC as to where to place the data. Conventional systems may also include receivers that, in advance, do not know the location of the control information inside the received segment. The only way to find the location of the control information is by processing ULPDUs in a sequential fashion, locating the ULPDU header and processing the ULPDU header according to a specific protocol. The receiver is faced with a choice of either dropping the out-of-order segments and requesting retransmission, which is costly in terms of delay and performance loss, or buffering the out-of-order segments until all the missing segments have been received. Some conventional implementations may choose to accumulate the out-of-order segments, to wait for the missing TCP segments to be received, and then to place them in order. Once the TCP segments have been ordered, then the receiving NIC may commence with the processing of the whole set of TCP segments. The receiving NIC may then analyze the ULP control portions to obtain information relating to data placement. If ULP placement is not used, then an additional copy copied from a TCP temporary buffer to the ULP may be necessary. The process suffers from additional costs including, for example, a temporary buffer, a higher powered CPU and a wider data path. In the case of ULP placement, the process is protocol specific which makes it more difficult to support various protocols. The receiving NIC has to process all the accumulated out-of-order TCP segments concurrently with the reception of new TCP segments from the wire at wire speed, as traffic on the link may continue all the time. This further strains the memory interface and the NIC's header processing entity (e.g., an embedded CPU) and forces the NIC architecture to support an effectively higher data rate than the wire rate.

Further limitations and disadvantages of conventional and traditional approaches will become apparent to one of ordinary skill in the art through comparison of such systems with some aspects of the present invention as set forth in the remainder of the present application with reference to the drawings.

BRIEF SUMMARY OF THE INVENTION

Aspects of the present invention may be found in, for example, systems and methods that provide self-describing transport protocol segments. In one embodiment according to some aspects of the present invention, a system that handles transport protocol segments may be provided. The system may include, for example, a sender that adapts a transport protocol segment. The transport protocol segment may include, for example, a self-describing header and an indicator. The indicator may indicate, for example, at least one of the presence and the location of the self-describing header.

In another embodiment according to some aspects of the present invention, a system that handles transport protocol segments may be provided. The system may include, for example, a receiver adapted to process a transport protocol segment. The transport protocol segment may include, for example, a self-describing header and an indicator. The indicator may indicate, for example, at least one of the presence and the location of the self-describing header. In yet another embodiment, the receiver may be adapted to process the transport protocol segment in a flow-through manner and/or in a non-flow-through-manner.

In yet another embodiment according to some aspects of the present invention, a method that forms self-describing transport protocol segments may be provided. The method may include, for example, one or more of the following: inserting a self-describing header in a transport protocol segment; and inserting an indicator that indicates at least one of the presence and the location of the self-describing header in the transport protocol segment.

In yet still another embodiment according to some aspects of the present invention, a method that handles transport protocol segments in a flow-through manner may be provided. The method may include, for example, one or more of the following: locating an indicator residing in a transport protocol segment, the indicator indicating at least one of the presence and the location of a self-describing header; locating the self-describing header; and directly placing data information stored in the transport protocol segment using information residing in the self-describing header. In another embodiment according to some aspects of the present invention, direct data placement may be possible for in-order transport protocol segments and out-of-order transport protocol segments.

These and other features and advantages of the present invention may be appreciated from a review of the following detailed description of the present invention, along with the accompanying figures in which like reference numerals refer to like parts throughout.

BRIEF DESCRIPTION OF THE DRAWINGS

FIGS. 4A-E show exemplary embodiments of a self-describing transport protocol segment according to the present invention.

FIGS. 5A-B show exemplary embodiments of a self-describing transport protocol segment according to the present invention.

DETAILED DESCRIPTION OF THE INVENTION

Some aspects of the present invention may relate, for example, to a protocol that provides that each transport protocol segment is self describing. The protocol may adapt a receiver to minimize buffering requirements by being able to identify a data portion in every received segment, to ensure that the data portion is error free, to find placement information for the highest hierarchy host memory buffer and to post the data portion to that host memory (e.g., a temporary buffer, an upper layer protocol (ULP) buffer or an application buffer residing in the host memory). Each received segment (e.g., each received transmission control protocol (TCP) segment, a stream control transmission protocol (SCTP) chunk, etc.) may carry enough control information to allow the receiver to process the received segment independently of any other segments that might, for example, be carrying other pieces of the data (e.g., an upper layer protocol data unit (ULPDU)). In some embodiments, the present invention may provide for data placement whether the segments are received in order or out of order.

Figure 1:
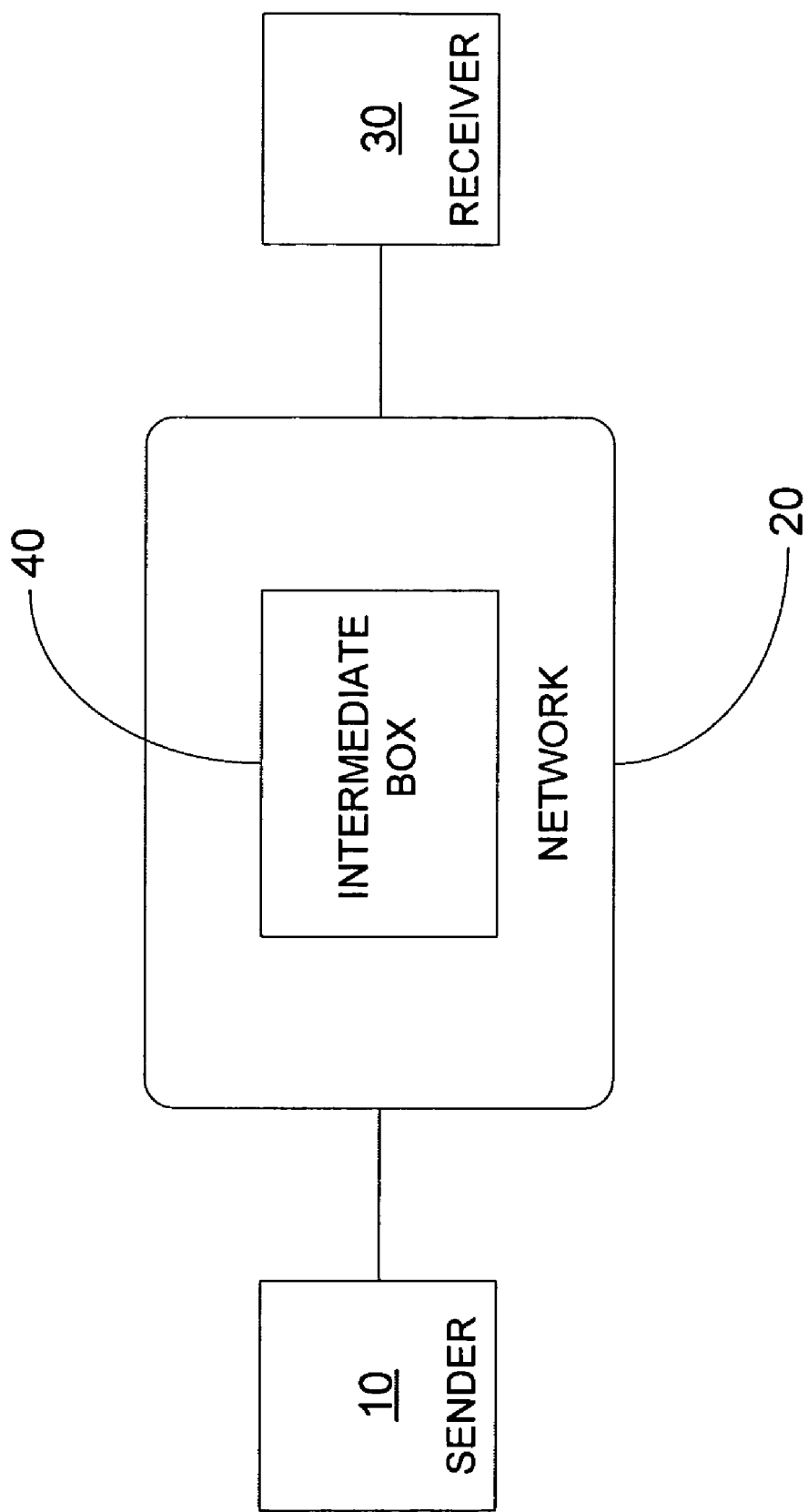
FIG. 1 shows an embodiment of a system that may provide self-describing transport protocol segments according to the present invention.

FIG. 1 shows an embodiment of a system that may provide self-describing transport protocol segments according to the present invention. In one embodiment, the present invention may provide, for example, a method that may identify, for example, the ULP control information and the ULPDU payload in a byte stream transport protocol (e.g., a framing protocol). A sender 10 (e.g., a client) may be coupled to a receiver 30 (e.g., a server) via a network 20 such as, for example, the internet. The network 20 may optionally include an intermediate box 40. A TCP connection may be initiated between the sender 10 and the receiver 30. The intermediate box 40 (e.g., a firewall) may terminate the TCP connection of the sender 10 and may initiate another TCP connection with the receiver 30. The sender 10 or the receiver 30 need not be aware of the intermediate box 40. The intermediate box 40 may receive a first set of TCP frames from the sender 10 and resegment the first set of TCP frames into a second set of TCP frames. The resegmentation of the first set of TCP frames may result, for example, in smaller TCP frames. In such a case, the TCP frame scheme sent by the sender 10 may not be the TCP frame scheme received by receiver 30. However, in some embodiments, the intermediate box 40 may send all the data that it has received and may not change the content or the order of the received data. Thus, the receiver 30 may receive the same byte stream (e.g., a transport protocol payload) sent by the sender 10, except that the segment size received by the receiver 30 may be different from the segment size sent by the sender 10.

Figure 2:
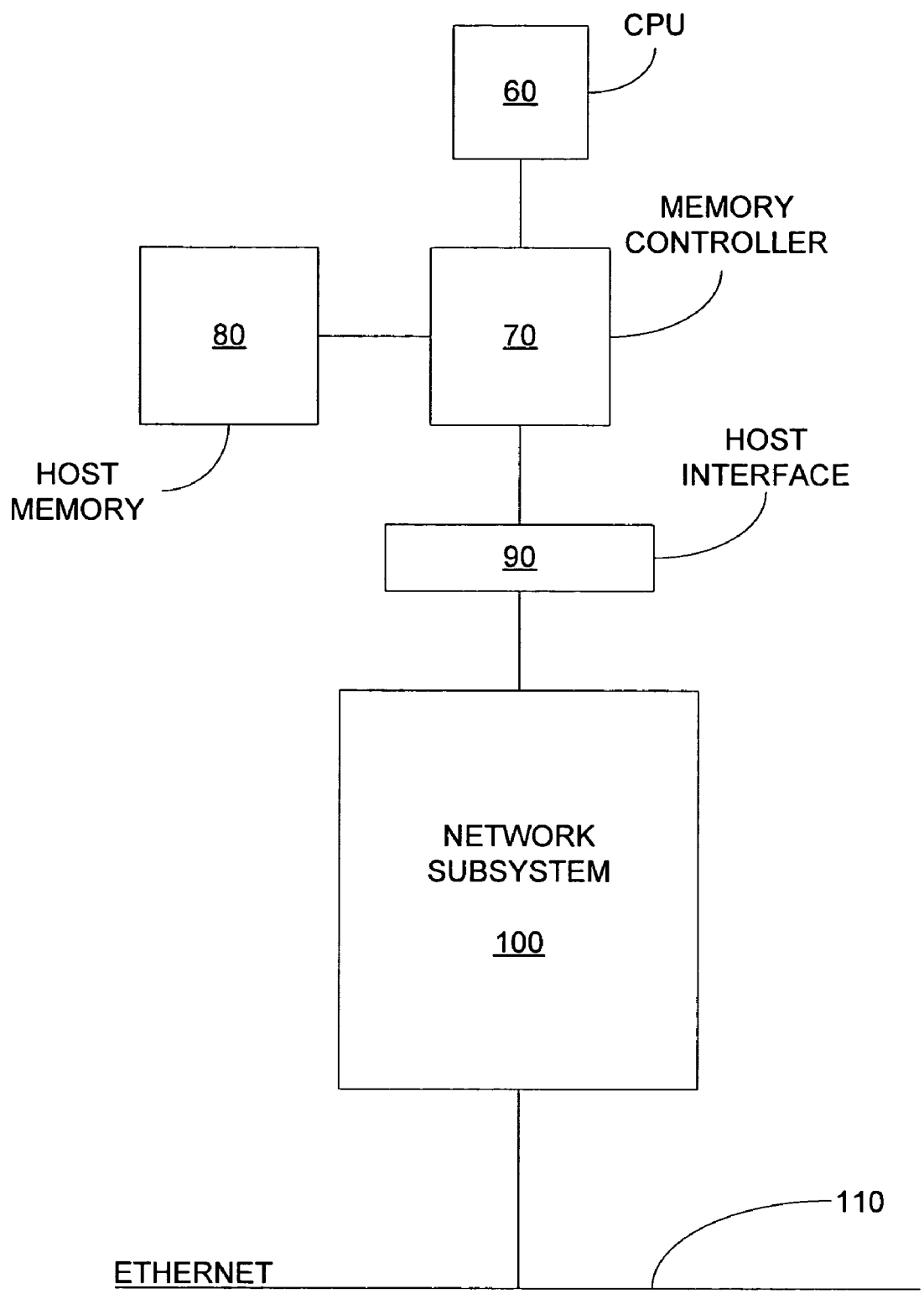
FIG. 2 shows an embodiment of a system that handles transport protocol segments in a flow-through manner according to the present invention.

FIG. 2 shows an embodiment of a system that handles the TCP frames in a flow-through manner according to the present invention. Accordingly, in some embodiments, the system may process all transport protocol segments as they are received from the wire whether the transport protocol segments are in order or out of order. Furthermore, placing data need not be contingent upon re-ordering the transport protocol segments. Thus, in some embodiments, the system need not buffer the transport protocol segments until the transport protocol segments are re-ordered or until a missing transport protocol segment is received.

The system may include, for example, a central processing unit (CPU) 60, a memory controller 70, a host memory 80, a host interface 90, network subsystem 100 and an Ethernet 110. The network subsystem 100 may include, for example, a TCP-enabled Ethernet Controller (TEEC) or a TCP offload engine (TOE). The network subsystem 100 may be, for example, a network interface card (NIC). The host interface 90 may be, for example, a peripheral component interconnect (PCI) or another type of bus. The memory controller 70 may be coupled to the CPU 60, to the host memory 80 and to the host interface 90. The host interface 90 may be coupled to the network subsystem 100.

Figure 3:
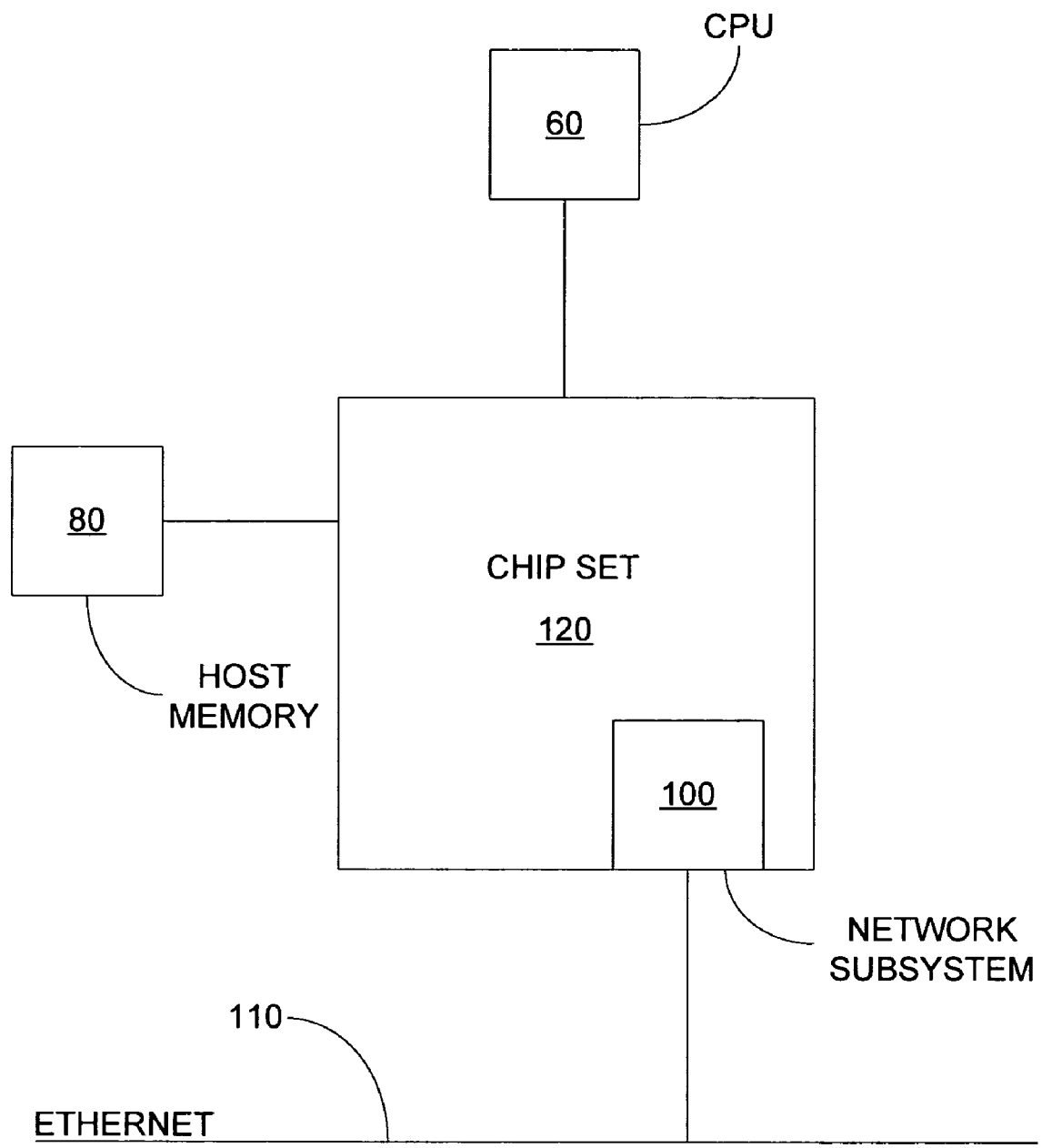
FIG. 3 shows another embodiment of a system that handles transport protocol segments in a flow-through manner according to the present invention.

FIG. 3 shows another embodiment of a system that handles TCP segments in a flow-through manner according to the present invention. The system may include, for example, the CPU 60, the host memory 80 and a chip set 120. The chip set 120 may include, for example, the network subsystem 100. The chip set 120 may be coupled to the CPU 60, to the host memory 80 and to the Ethernet 110. The network subsystem 100 of the chip set 120 may be coupled to the Ethernet 110. The network subsystem 100 may include, for example, the TEEC or the TOE which may be coupled to the Ethernet 110. A dedicated memory may be part of and/or coupled to the chip set 120 and may provide buffers for context or data.

Although illustrated, for example, as a CPU and an Ethernet, the present invention need not be so limited to such exemplary examples and may employ, for example, any type of processor and any type of data link layer or physical media, respectively. Accordingly, although illustrated as coupled to the Ethernet 110, the network subsystem 100 may be adapted for any type of data link layer or physical media. Furthermore, the present invention also contemplates different degrees of integration and separation between the components illustrated in FIGS. 2 and 3.

In operation according to one embodiment of the present invention, the sender 10 may create self-describing TCP segments. If the ULPDU is larger than the TCP segments, then the ULPDU may be split among a plurality of TCP segments. The sender 10 may insert at least two pieces of information into each TCP segment: a self-describing header and an indicator of the presence and/or the location of the self-describing header. The TCP segments may be transmitted to the receiver 30 via, for example, the network 20. The network subsystem 100 may receive the TCP segments via, for example, the Ethernet 110. The network subsystem 100 may receive the TCP segments in order or out of order and may process the TCP segments in a flow through manner. The network subsystem 100 may employ, for example, a TCP-enabled Ethernet controller (TEEC) or a TCP offload engine (TOE) adapted to facilitate the placement of the data contained in the TCP segment into a temporary buffer, a ULP buffer or an application buffer residing in the host memory 80. The indicator contained in the received segment may inform the network subsystem 100 of the self-describing header contained in the TCP segment. Using at least the information contained in the self-describing header and possibly other information not necessarily contained in the self-describing header (e.g., some information such as, for example, error correction may be located, for example, in a dedicated trailer just before an Ethernet trailer), the network subsystem 100 may place the ULP data at a particular memory location, for example, in a ULP buffer residing in the host memory 80. Accordingly, whether the TCP segment is in order or out of order, since the TCP segment is self describing, the network subsystem 100 may copy the data, for example, from the wire to a determined buffer location of the ULP buffer residing in the host memory 80.

Figure 4A:
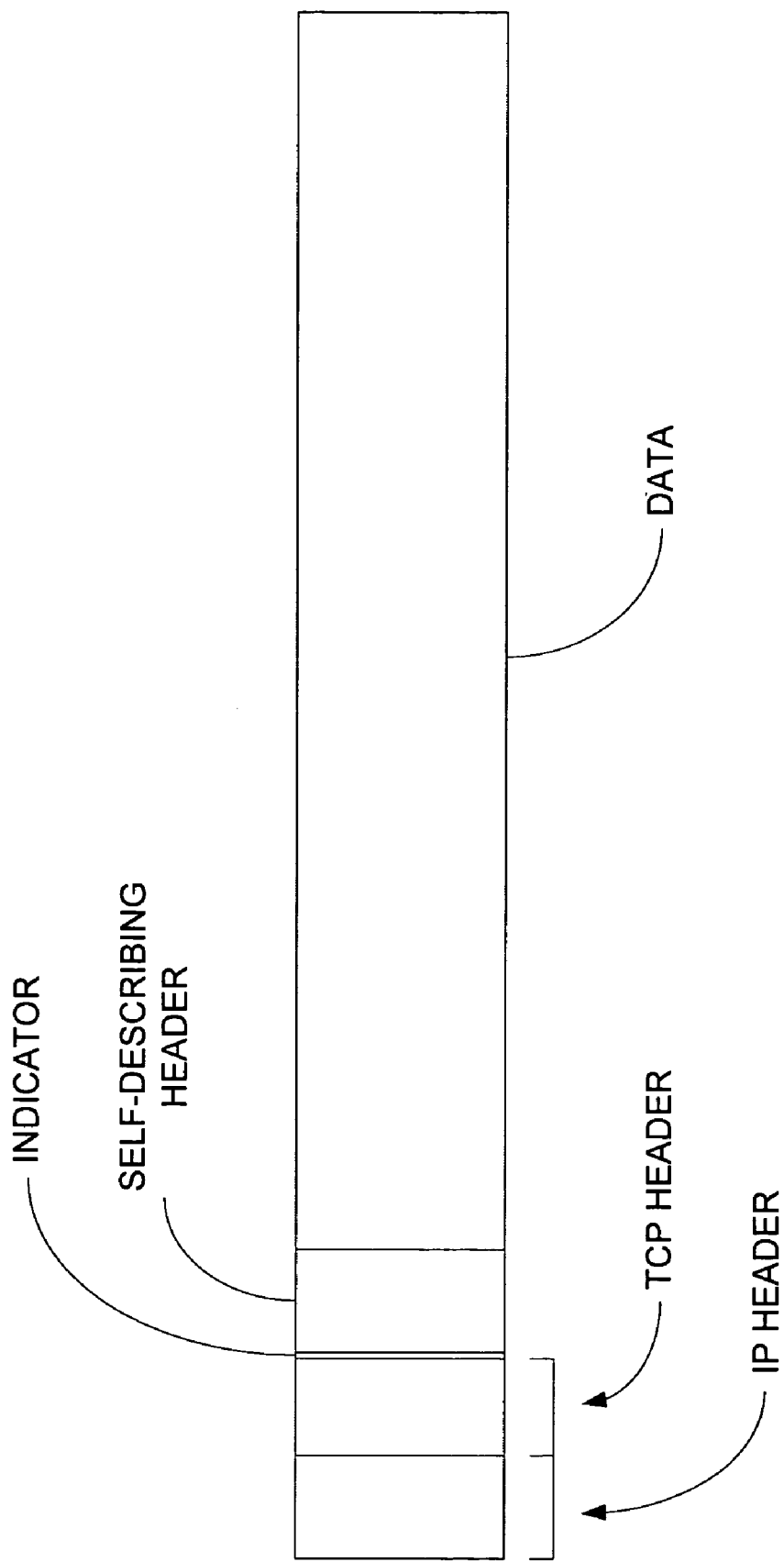

FIGS. 4A-D show exemplary embodiments of a self-describing TCP segment according to the present invention. The self-describing TCP segment may include, for example, a TCP header, a self-describing header and data. In some embodiments, the self-describing header is disposed in a location known to the receiver 30. For example, the self-describing header may be placed right after the TCP header as illustrated in FIG. 4A. Thus, the task of finding the self-describing header may be made easier for the receiver 30. However, as discussed previously, the intermediate box 40 may move the self-describing header to a different location within the TCP segment due to resegmentation. Nevertheless, the receiver 30 may find the original location of the self-describing header with the aid of an indicator.

Figure 4B:
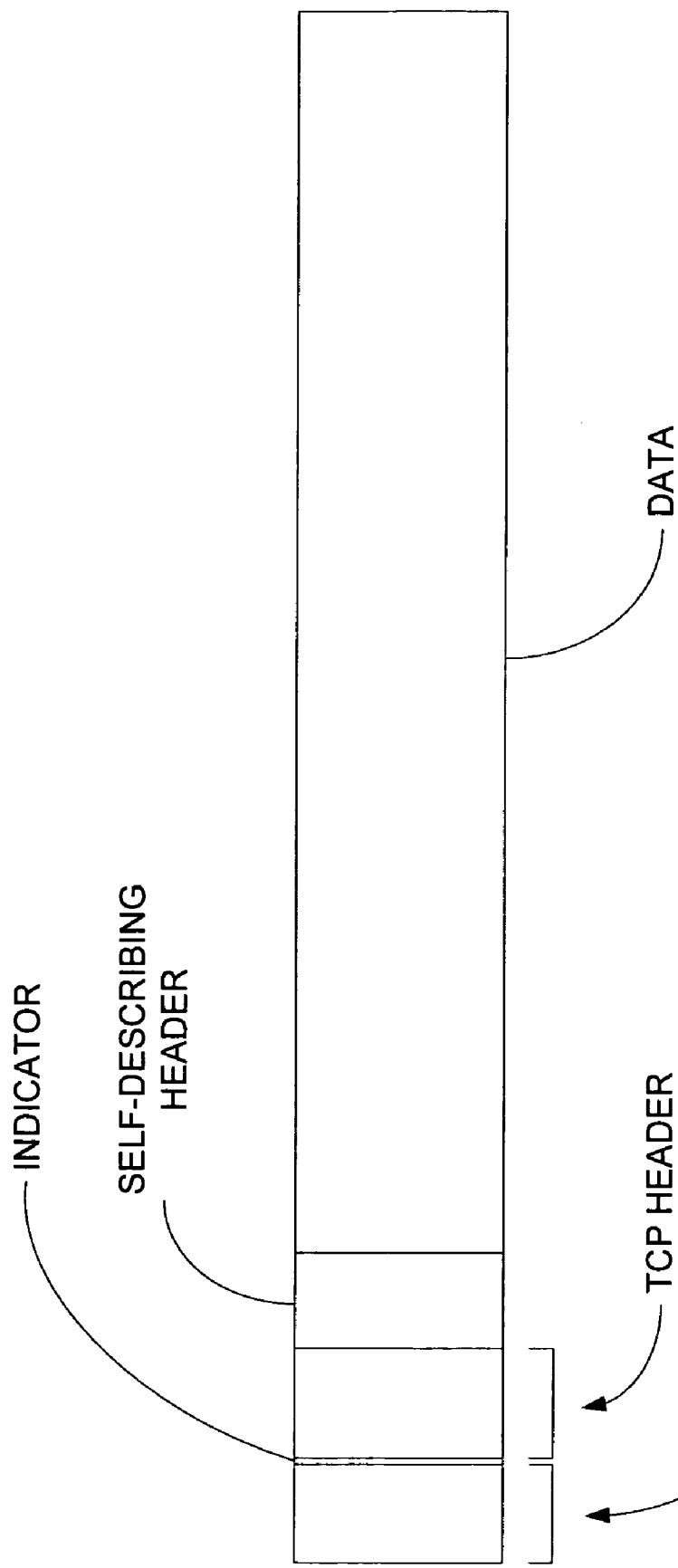
Figure 4D:
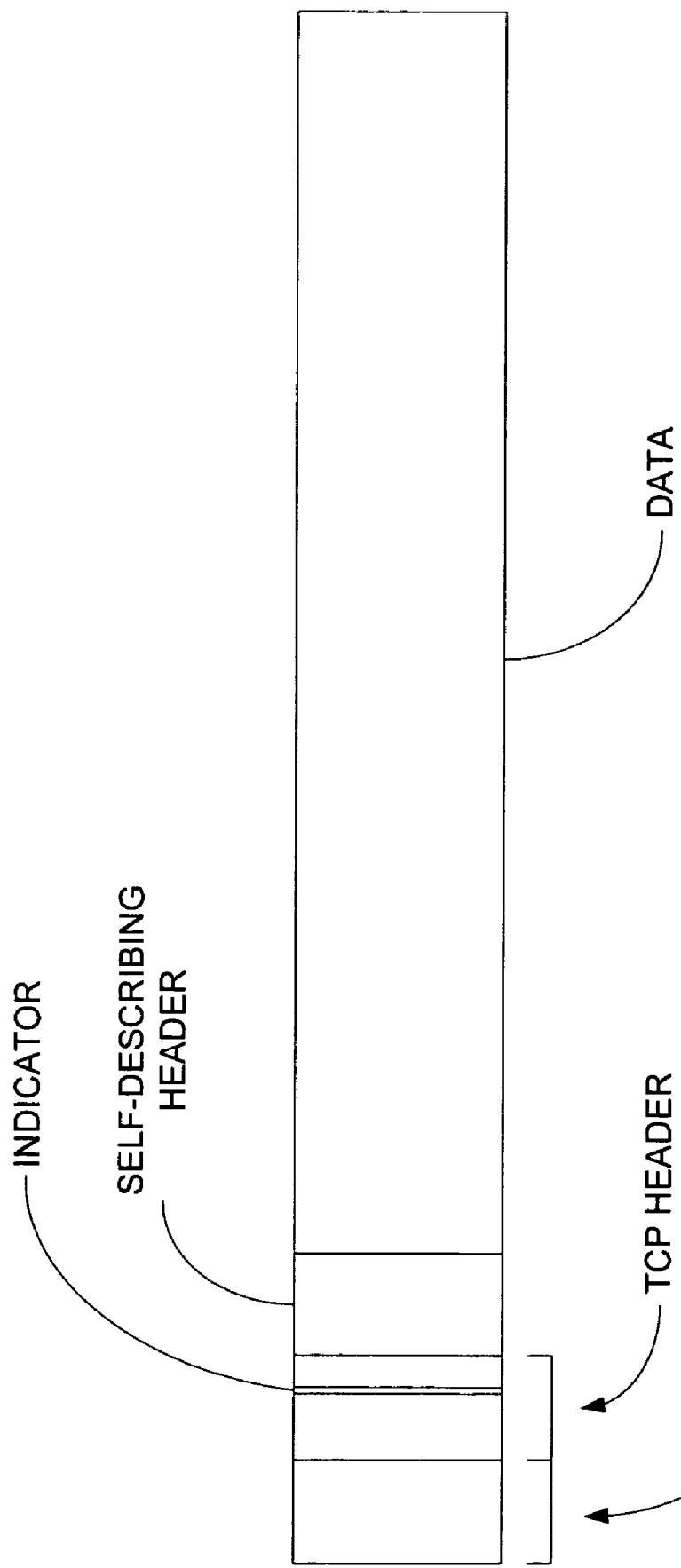

FIG. 4A shows but one possible location of the indicator, namely, after the TCP header; however, the indicator may also be located in other frame or segment locations. For example, the self-describing header may be disposed after the IP header. FIG. 4B shows an exemplary embodiment in which the self-describing header is disposed between the IP header and the TCP header. In another embodiment, the self-describing header may be disposed within the IP header as illustrated in FIG. 4C. In yet another embodiment, the self-describing header may be disposed within the TCP header as illustrated in FIG. 4D. In yet still another embodiment, the self-describing header may be disposed within the data portion of the frame or segment as illustrated in FIG. 4E.

In some embodiments, the self-describing header may be disposed in any number of locations within a frame or a segment. For example, the self-describing header may be disposed after the TCP header as illustrated in FIGS. 4A-D. The self-describing header may be disposed after the IP header. For example, in FIG. 4E, the self-describing header may be disposed between the IP header and the TCP header. However, the disposition of the self-describing header need not be so limited. The location of the self-describing header may also be determined from information carried in the indicator.

Figure 5A:
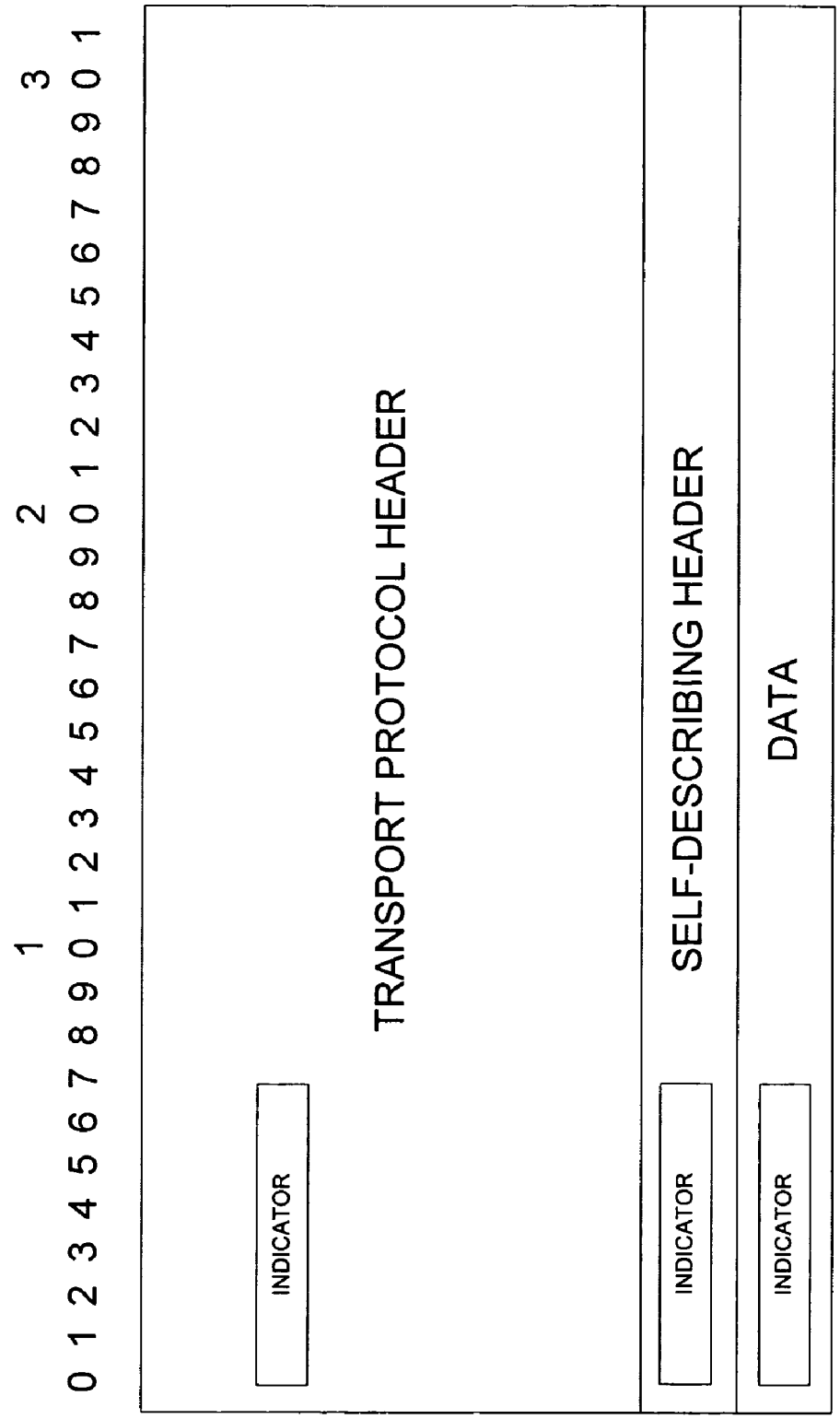

FIGS. 5A-B show exemplary embodiments of a transport protocol segment according to the present invention. The illustrated sections of the transport protocol segment are not necessarily to scale. Referring to FIG. 5A, a transport protocol segment may include, for example, a transport protocol header, a self-describing header and a data portion. Two pieces of information may be added to every transport protocol segment (e.g., every TCP segment) on the wire: an indicator indicating the presence and/or the location of a self-describing header and the self-describing header. The indicator may reside, for example, in the transport protocol header, the self-describing header, the data or elsewhere in a frame or segment (e.g., outside the transport protocol segment).

Referring to FIG. 5B, an exemplary embodiment of a TCP segment is illustrated according to the present invention. In one embodiment, the indicator may reside in the self-describing header. In various embodiments, the indicator may reside in the TCP header. For example, the indicator may reside in the options field of the TCP header and may be a new TCP option. In another embodiment, the indicator may reside in a reserved field of the TCP header and may use one or more of the TCP header reserved bits. In yet another embodiment, the indicator may reside in a new field (e.g., a dedicated field) provided inside the TCP payload or the TCP header. For example, the location of the ULP buffer residing in the host memory 80 for storing the payload of the transport protocol segment may be carried in a new field that is added to the transport protocol segment payload or that is placed in a location known to the receiver 30. The new field may include, for example, information relating to the ULP buffer location for the data portion of the transport protocol segment. The indicator may also be placed in known locations in the data stream.

Although one or more embodiments described herein may relate to self-describing transport protocol segments, the present invention need not be so limited. Accordingly, the present invention also contemplates applying self-describing headers and indicators with respect to other types of segments, frames or packets.

One or more embodiments according to some aspects of the present invention may include, for example, one or more of the advantages as set forth below. Since each transport protocol segment is self describing, the buffer size or the number of buffers may be reduced or eliminated on the receiver 30. For example, the buffers on the network subsystem 100 (e.g., the buffers on the NIC of the network subsystem 100) or the buffers coupled to the network subsystem 100 that may have been used for buffering out-of-order transport protocol segments may be reduced or eliminated since self-describing transport protocol segments may generally be handled by the network subsystem 100 in a flow-through manner that may be independent of other transport protocol segments.

The reduction or elimination of the buffers on the receiver 30 may enable a single-chip solution including, for example, a transport-level controller (e.g., a TOE). With a single-chip solution, the transport-level controller may support LAN-on-motherboard (LOM) for use in, for example, high volume, small foot print servers.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A system for handling transport protocol segments, comprising:
   a receiver adapted to process a transport protocol segment that has been resegmented by an intermediate network device in a communication pathway between the receiver and a sender,
   wherein the transport protocol segment received by the receiver is a different size than the transport protocol segment sent by the sender,
   wherein the receiver is unaware of the received transport protocol segment has been resegmented by the intermediate network device,
   wherein the transport protocol segment comprises a self-describing header and an indicator, the self-describing header not being part of a transport protocol header of the transport protocol segment,
   wherein a position of the self-describing header has changed in the transport protocol segment due to the intermediate network device resegmenting the transport protocol segment, and
   wherein the receiver uses the indicator to locate the position of the self-describing header in the transport protocol segment.

2. The system according to claim 1, wherein the receiver is adapted to process the transport protocol segment in a non-flow-through manner.

3. The system according to claim 1, wherein the receiver is adapted to process the transport protocol segment in a flow-through manner.

4. The system according to claim 1,
   wherein the transport protocol comprises at least one of a TCP and a stream control transmission protocol (SCTP), and
   wherein the transport protocol segment comprises at least one of a TCP segment and an SCTP segment.

5. The system according to claim 4, wherein the indicator resides in an options field of a TCP header of the TCP segment.

6. The system according to claim 4, wherein the indicator resides in a reserved field of a TCP header of the TCP segment.

7. The system according to claim 4, wherein the indicator resides in a field residing in a TCP payload of the TCP segment.

8. The system according to claim 4, wherein the self-describing header comprises control information used to place data information in the TCP segment.

9. The system according to claim 1, wherein the self-describing header is disposed within at least one of a transport protocol header, a network protocol header and a payload.

10. The system according to claim 1, wherein the self-describing header is disposed between a transport protocol header and a network protocol header or after the transport protocol header.

11. The system according to claim 1, wherein the receiver uses information residing in the self-describing header to place data information in the transport protocol segment into a host memory of the receiver.

12. The system according to claim 1, wherein the receiver copies the data from an Ethernet to a location in an ULP buffer by using information stored in the self-describing header.

* * * * *